United States Patent [19]

Krogh et al.

[11] Patent Number: 4,638,791
[45] Date of Patent: Jan. 27, 1987

[54] APPARATUS AND METHODS FOR PROVIDING RAPID PROTECTION FROM ACCELERATIVE FORCES EXPERIENCED BY AIRCRAFT CREW MEMBERS

[75] Inventors: Steven B. Krogh, King County; Adam J. P. Lloyd, Seattle, both of Wash.

[73] Assignee: The Boeing Company, Seattle, Wash.

[21] Appl. No.: 757,740

[22] Filed: Jul. 22, 1985

[51] Int. Cl.⁴ .................................................. A62B 7/14
[52] U.S. Cl. ................................ 128/1 A; 128/204.23; 128/204.29
[58] Field of Search ............. 128/1 A, 202.11, 204.18, 128/204.21, 204.26, 204.29; 244/1 R, 118.5

[56] References Cited

U.S. PATENT DOCUMENTS

| 3,089,482 | 5/1963 | Gray | 128/1 A |
|---|---|---|---|
| 3,158,149 | 11/1964 | Gray | 128/1 A |
| 3,734,078 | 5/1973 | Cramer et al. | 128/1 A |
| 3,780,723 | 12/1973 | Van Patten et al. | 128/1 A |
| 4,219,039 | 8/1980 | Jaggars | 128/1 A |
| 4,230,097 | 10/1980 | Beaussant et al. | 128/1 A |
| 4,243,024 | 1/1981 | Crosbie et al. | 128/1 A |
| 4,336,590 | 6/1982 | Jacq et al. | 128/1 A |
| 4,534,338 | 8/1985 | Crosbie et al. | 128/1 A |

Primary Examiner—Henry J. Recla
Attorney, Agent, or Firm—Hughes & Cassidy

[57] ABSTRACT

Apparatus and methods for increasing the tolerance level of an aircraft aircrew member to G forces by providing a rapid response to the onset of the normal accelerative forces to inflate an anti-G suit worn by the aircrew member. An electronic controller controls a servo valve which in turn controls a main valve for regulating the flow of gas into the inflatable G suit. The G suit is worn by the aircraft crew member to prevent pooling of blood in the lower portion of the body during aircraft maneuvers when G forces are experienced. The electronic controller receives a first input indicative of the amount of force applied to the control stick of the aircraft by the crew member, and a second input indicative of measured accelerative forces which are normal to the longitudinal axis of the aircraft. The electronic controller, preferably a microprocessor based controller, is responsive to the first input, and includes a programmable memory for storing data defining a schedule of the anticipated accelerative force levels which the aircraft will experience as a function of the applied control stick force. The microprocessor is programmed to decrease the anticipated accelerative force levels at a predetermined rate which is approximately equivalent to the rate of increase of measured accelerative forces. The anticipated force level is added to the actual accelerative force level to produce a command output for controlling the servo valve and/or for controlling a pressure regulator to initiate positive pressure breathing in a breathing device worn by the aircrew member.

31 Claims, 6 Drawing Figures

APPARATUS AND METHODS FOR PROVIDING RAPID PROTECTION FROM ACCELERATIVE FORCES EXPERIENCED BY AIRCRAFT CREW MEMBERS

The U.S. Governments has rights in the invention of the present application pursuant to Contract No. F33615-83-C-0651 awarded by the U.S. Department of the Air Force.

TECHNICAL FIELD

The present invention relates to apparatus and methods for providing rapid protection from accelerative forces experienced by occupants of an aircraft, and more particularly to apparatus and methods for controlling the pressurization of an anti-acceleration garment worn by the occupants wherein aircraft control forces generate an output to initially inflate the anti-acceleration garment as a function of applied control forces.

BACKGROUND OF THE INVENTION

Military jet aircraft crew members have been wearing an anti-G protection suit for many years to protect themselves against "gray out" or "black out" experienced when performing high speed, turning maneuvers in an aircraft. These turning maneuvers may be in the horizontal plane as when the aircraft is changing its heading, in the vertical plane as when the aircraft is pulling out of a dive, or in a combination of the horizontal and vertical planes. The anti-G suit is typically a trouser-like garment which includes individual sections zippered about the pilot's calves, thighs and abdomen to provide a snug fit thereabout. These individual sections contain inflatable bladders which are connected to an aircraft air supply system through a detachable hose which is integrally connected to the G suit. As the pilot experiences greater accelerative forces, pressurized air is continually admitted into the inflatable bladders to increase the pressure about the pilot's legs and abdomen to reduce the amount of blood draining into these areas. In conventional aircraft G suit systems, accelerometers in the aircraft sense the accelerating force which the aircraft and aircrew member are experiencing. These accelerometers transmit a signal, either mechanically or electrically, to a valve interposed within an air supply system, to control the inflation of the G suit bladders to a predetermined pressure in order to offset the effects of the aircraft's acceleration. The purpose of the G suit is to reduce the flow of blood from the pilot's torso into the legs and feet during aircraft maneuvers where large accelerative forces are experienced. As the accelerative forces increase, there is a tendency for additional blood to leave the head and upper torso resulting initially in "gray out" where the pilot's vision begins to "tunnel" and blur, and then sometimes to "black out" where the pilot loses vision entirely, and ultimately loses consciousness. The pressurized G suit increases tissue pressure in the abdomen and lower limbs thereby maintaining peripheral vascular resistance and reducing blood pooling in the lower extremities. In addition, the abdominal bladder supports the abdominal wall thereby reducing the distance in which the aircrew member's breathing diaphragm is displaced downward, and minimizing the increase in vertical distance between the heart and the brain which the accelerative forces promote.

The environment in which military jet aircraft are typically subjected to the greatest amount of accelerative forces is in combat or simulated combat situations, such as air combat maneuvering (ACM), where aircraft are attempting to maneuver behind one another in order to direct their weapons. A critical element for surival in an ACM environment is the maintenance of the pilot's vision, including peripheral vision, in order to maneuver relative to the opposing aircraft. A significant problem with conventional G suit protection systems is the time delay between G force onset and G suit pressurization, thereby reducing the amount of protection afforded to the aircrew member. Conventional systems may take up to five seconds to pressurize the G suit to the desired pressure. Centrifuge tests have shown that gray out can occur as soon as one and one-half seconds after G force onset, and unconsciousness within three seconds of G force onset. See, for example, J. Ernsting, *Aviation Medicine—Physiology and Human Factors*, TRI-MED (1978), p. 231.

Accelerative forces are normally described in relationship to one G, or in other words, the accelerative force a body experiences at the earth's surface when at rest. Accelerative forces exceeding one G are described in terms of a factorial number of G's. For example, an aircraft in a tight turn might experience six G's or more, which is an accelerative force of six times the normal force of gravity. The present generation of military jet aircraft, such as the F-16, using sophisticated airframe materials are designed to be flown in a service envelope of up to nine G's. This is a significant increase over the previous generation of military jet aircraft which had service G limitations of six or seven G's. It should be appreciated that increasing the G tolerance of the aircraft allows the pilot to turn the aircraft at a higher rate, as well as through a smaller turn radius, to aid in maneuvering to an advantageous position relative to other aircraft. The physiological effects of experiencing G forces may vary according to the size and general health of the aircrew member. Without G suit protection, "gray out" can occur as low as three or four G's, while "black out" can occur as low as five or six G's.

Many military jet aircraft have service ceilings above 40,000 feet and are equipped with oxygen administered to the aircrew member through an oxygen mask worn about the mouth and nose. Typically, the oxygen system is a demand type apparatus wherein the oxygen is inhaled and exhaled as the aircrew member's lungs expand and contract. However, as the aircraft cockpit reaches an altitude of 40,000 feet or more, the oxygen must be supplied to the lungs at a pressure exceeding that of the cockpit to prevent hypoxia. Typically, the aircraft will include a positive pressure breathing system which automatically supplies oxygen under pressure to the mask and into the aircrew member's lungs to ensure an adequate supply of oxygen is maintained therein.

It has been found that high altitude positive pressure breathing is aided by exerting pressure against the upper portion of the body, particularly around the chest and abdominal areas, because the pressure exerted assists the aircrew member in exhaling breath gases from the lungs against the positive pressure in the face mask. Therefore, an inflatable garment called a counterpressure garment is worn around the chest and back area so that during positive pressure breathing the counterpressure garmet is also inflated to the same pressure as in the mask. It is also desirable in a high altitude environment to pressurize the anti-G suit to a predetermined ratio of the positive pressure in the breathing mask; e.g. typically four times mask pressure.

It has also been found that G protection is enhanced by positive pressure breathing because the increase in breathing pressure causes an approximately equal increase in heart level blood pressure, thereby increasing the flow of blood to the brain. Therefore, it is sometimes desirable to initiate positive pressure breathing at some minimum G force level. When the predetermined level of G force is encountered, or when the pressure in the G suit reaches an equivalent value, a signal is transmitted to a breathing regulator to initiate positive pressure breathing to the face mask, which by means of a valving system automatically initiates inflation of the counter pressure garment.

In U.S. Pat. No. 4,336,590—Jacq, et al, there is disclosed a regulatory apparatus for pre-inflating an anti-G suit to a predetermined fixed level, e.g., ten millibars, when actuated by a signal caused by rapid movement of the aircraft's control stick. The regulatory apparatus also causes pre-inflation of the anti-G suit to a slight pressure when it is signaled that positive pressure breathing is occurring.

In U.S. Pat. No. 4,230,097—Beaussant, et al, there is disclosed a regulating apparatus for controlling the gas pressure in an anti-G suit, including means for pre-inflating the G suit to a predetermined pressure level as soon as the flight controls of the aircraft are placed in a position which will cause acceleration of the aircraft. Inflation of the G suit to the required pressure is a function of the acceleration experienced by the aircraft and is controlled by an acceleration responsive control valve.

In U.S. Pat. No. 4,243,024—Crosbie, et al, there is disclosed a regulating apparatus for inflating an anti-G suit based upon a measured acceleration and an angle defined by an intersection of the vertical axis of the aircraft with the thoracic axis of the pilot.

In U.S. Pat. No. 3,780,723—Van Patten, et al, there is disclosed a control system for an inflatable G suit based upon the acceleration which the aircraft experiences summed with the time rate of change of the aircraft acceleration.

In U.S. Pat. No. 4,219,039—Jaggars, there is disclosed a control system for pressurizing an aircrew anti-G suit over a variable rate inflation schedule.

In U.S. Pat. No. 3,158,149—Gray, there is disclosed a control system for an inflatable jacket worn by an aircraft aircrew member wherein an acceleration responsive metering valve controls the amount of pressurized air supplied to the jacket.

In U.S. Pat. No. 3,089,482—Gray, there is disclosed a closed volume suit, containing an incompressible liquid therein, to be worn by an aircrew member so that the aircrew member's body is submerged in the liquid to counterbalance the distortion of body tissues caused by accelerative forces.

In U.S. Pat. No. 4,039,039—Gottfried, there is disclosed trousers having inflatable chambers which are worn by a patient experiencing a health emergency to immobilize the body or to reduce or inhibit bleeding in the lower torso and legs.

In West German Pat. No. WO 82/01464, there is disclosed a safety suit for a motorcyclist wherein the safety suit has chambers which automatically inflate upon the rider's rapid ejection from the motorcycle.

SUMMARY OF THE INVENTION

The present invention comprises apparatus for controlling the pressurization of an anti-acceleration garment worn by an occupant of an aircraft. Typically, the anti-acceleration garment is a set of trousers having bladders therein which are inflated in response to accelerative forces substantially perpendicular to the longitudinal axis of the aircraft. Inflation of the bladders in the trousers around the calves and thighs resist pooling of blood in the lower extremities of the body. The apparatus comprises valve means for regulating the flow of fluid to the anti-acceleration garment to control the pressurization of the garment. The apparatus also comprises control means including means (i) for determining an anticipated level of accelerative forces, perpendicular to the longitudinal axis of the aircraft, as a function of a control input to the aircraft, and (ii) for generating a first output indicative of the anticipated level. The control means also includes means (i) for determining an actual level of accelerative forces perpendicular to the longitudinal axis of the aircraft, and (ii) for generating a second output indicative of the actual level. Also included are means for decreasing the first output at a predetermined rate to generate a third output indicative of the decreased output, and means for combining the second output with the third output to generate a first command output. The apparatus also includes valve control means (i) responsive to the command output, and (ii) operatively connected to the valve means, for regulating the valve means to control the flow of fluid to the anti-acceleration garment, thereby controlling the pressurization of the garment about the aircraft occupant's body.

The control input may be defined as a force applied to a control member of the aircraft by the occupant. Typically this force is applied to an aircraft flight control located in the aircraft cockpit which is typically in the form of a vertical stick member which moves fore and aft and laterally in response to the occupant's input in order to reposition the aircraft flight control surfaces.

The control means includes computer means having a memory for storing information which defines the anticipated accelerative forces as a function as the applied control force define the first output. The computer means also contains information for decreasing the level of the first output at the predetermined rate. The predetermined rate of decrease is substantially equivalent to the rate of increase of the actual accelerative forces. The rate of increase of the accelerative forces is a predetermined time constant equivalent to a time interval between initiation of the control input and response of the aircraft to the control input.

The control means also includes means for generating a fourth output representative of a bias pressure for maintaining partial inflation of the anti-acceleration garment during absence of the anticipated and actual accelerative forces. Also included are means for adding the fourth output to a sum of the second and third outputs to produce the first command output. Partial inflation of the anti-acceleration garment at all times reduces the time for inflation of the G suit garment to the desired pressure during the onset of accelerative forces.

The apparatus also comprises sensor means (i) for determining a pressure of a gas delivered to a breathing device worn by the occupant, and (ii) for generating a sixth output indicative of the gas pressure. Typically the breathing device is a mask worn about the occupant's face which provides oxygen to the occupant. Also included are means, responsive to (i) a sum of the second output and the third output, and (ii) the sixth output, arranged to output the greater of the sum of the second output and the third output, and the sixth output, to produce the first command output. This allows for pressurization of the anti-acceleration garment when undergoing positive pressure breathing for high attitude protection. In addition the control means includes second valve means for controlling a pressure of a gas delivered to the breathing device worn by the occupant of the aircraft, and second valve control means responsive to the first command output and operatively connected to the second valve means second valve means for regulating the second valve means to generate a pressure in excess of ambient pressure within the breathing device. This allows for positive pressure breathing when the occupant of the aircraft is subjected to accelerative forces in order to increase the tolerance of the occupant to those accelerative forces.

It is therefore an object of the present invention to provide an apparatus and method for providing rapid protection from accelerative forces experienced by a crew member of an aircraft.

BRIEF DESCRIPTION OF THE DRAWINGS

These and other objects and advantages of the present invention will become more readily apparent upon reading the following detailed description and upon reference to the attached drawings in which:

FIGS. 5A and 5B are graphs of pressures as a function of time, wherein FIG. 5A represents command pressure due to stick force ($P_{nzs}$), command pressure due to actual acceleration ($P_{nza}$), and output command pressure ($P_{nz}$), as a function of time, and FIG. 5B represents G suit pressure as a function of time.

Figure 1:
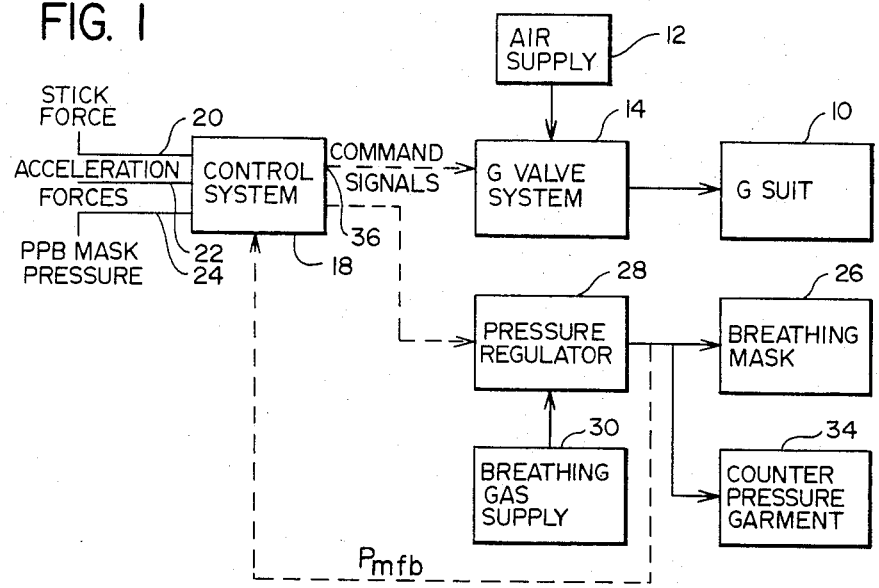
FIG. 1 is a block diagram illustrating the relationship of primary components of the present invention.

While the present invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION OF THE INVENTION

The present invention comprises a control system for providing rapid protection from accelerative forces normal, i.e. generally perpendicular, to the longitudinal axis of the aircraft (normal accelerative forces) experienced by crew members typically occupying high performance military jet aircraft. Referring to FIG. 1, protection is provided in the form of (i) an anti-G protection suit 10 comprising a trouser-like garment which typically surrounds the calves, thighs and abdomen of the aircrew member, and which contains inflatable bladders which are pressurized by an air source 12 located in the aircraft. Typically air source 12 comprises air from the engine compressor section, or compressed air carried in the aircraft. The amount and rate of inflation of G suit 10 is controlled by a G valve system 14 which controls the amount of air entering G suit 10 from air supply 12. Operation of G valve system 14 is controlled by an electronic control system 18 which relays command signals to G valve system 14 and which receives multiple inputs reflecting (i) control forces exerted against the flight controls by the pilot at input 20, (ii) normal accelerative forces measured by sensors in the aircraft at input 22, and (iii) positive pressure breathing face mask pressure at input 24. It is a feature of the present invention to provide a rapid input to the G valve system 14 to initiate inflation of G suit 10. As discussed previously, the physiological effects of normal accelerative forces can be detrimental to the aircrew member particularly in a high speed combat oriented environment. Conventional G suit control systems utilize sensing apparatus such as accelerometers to measure normal accelerative forces and to signal a control system to initiate inflation of the G suit. Due to a time lag in the pressurization of G suit 10 caused by, among other things, the time lag in the accelerometers sensing the accelerative forces, and a time lag for inflating the G suit, the aircrew member has typically experienced some accelerative forces prior to pressurization of the G suit. In the present invention, a command signal is provided from control system 18 to G valve system 14 which is proportional to forces applied to the aircraft controls by the pilot when changing the direction of the aircraft. Typically these forces are applied to the aircraft controls in a combination of lateral and fore and aft directions. The control force is relayed to control system 18 at an input 20. Therefore, pressurization of G suit 10 begins prior to the onset of the accelerative forces by a time approximately equal to the response time of the aircraft which is defined as the time between actuation of the flight controls by the pilot, and movement of the aircraft in response to the position of the flight controls.

As discussed previously, conventional G suit protection systems may utilize movement of the aircraft controls to initiate "pre-inflation" of the G suit bladder to some low pressure value independent of the accelerative forces experienced by the aircrew members. As the aircraft accelerometers measure the accelerative forces, the G suit is further inflated to the required pressure. G suit inflation response time in conventional systems is decreased somewhat because the G suit bladders are partially inflated, typically to some pressure value such as 0.25 psi, prior to the onset of G forces.

Figure 2:
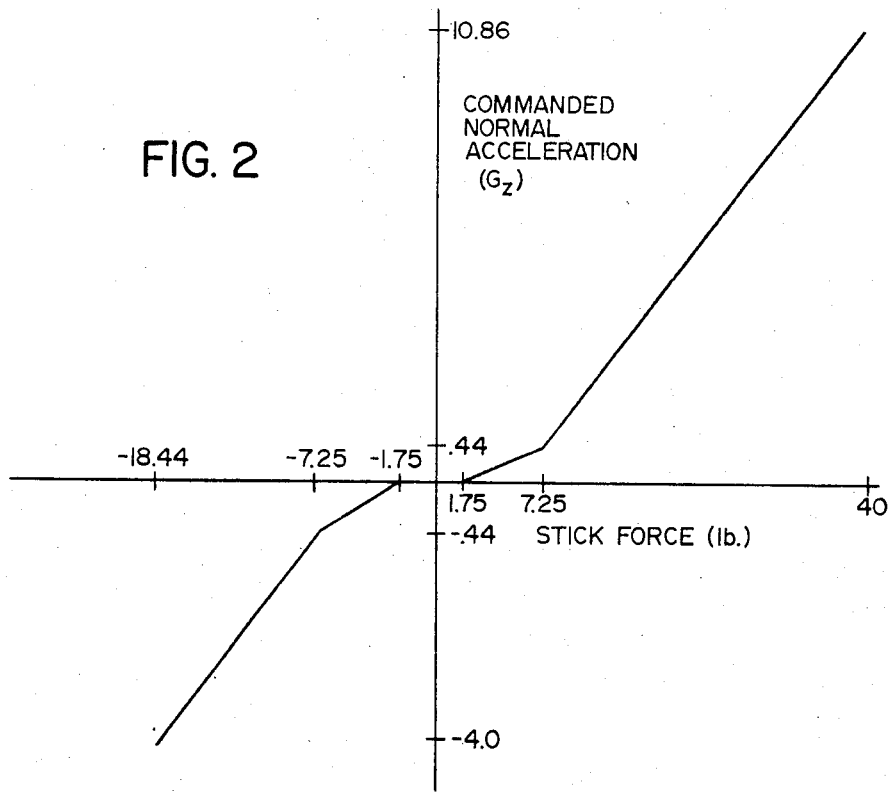
FIG. 2 is a graph of a typical schedule wherein acceleration normal to the longitudinal axis of an aircraft is a function of applied force to the aircraft controls.

The present invention makes use of the fact that the position of the aircraft flight control aerodynamic surfaces is a function of the forces exerted against the aircraft flight controls by the pilot. The greater the change in the position of the flight control surfaces, the greater the change in direction of the aircraft which increases the accelerative forces which the aircrew members experience. In some aircraft this force applied to the control input, typically a vertical control "stick", is evidenced by the degree of displacement of the control stick from the vertical axis. In other aircraft, sensors may be located on the control stick for measuring the forces applied to the stick. The aircraft aerodynamic flight control surfaces are then positioned as a function of these control forces. Military aircraft, such as the F-16, include digital flight control computers which are interfaced with the flight control sensors to direct the positions of the flight control surfaces in accordance with a preprogrammed schedule, such as the schedule illustrated in FIG. 2. In FIG. 2 the flight control surfaces produce a commanded aircraft normal acceleration as a function of the force applied to the control stick by the aircrew member. For example, utilizing an aircraft control system programmed in accordance with the schedule in FIG. 2, a force applied to the control stick of approximately forty pounds would displace the flight control surfaces of the aircraft sufficiently to achieve a normal acceleration of approximately 10.86 G's.

The present invention utilizes the forces exerted by the aircrew member against the aircraft control stick to initially regulate the pressure of G suit 10 via control system 18 and G valve system 14 at a predetermined pressurization rate which is a function of the applied stick force, in order to provide rapid protection from the normal accelerative forces resulting from displacement of the aircraft flight control services. Then, in order to regulate inflation of G suit 10 as a function of actual normal acceleration, the accelerative forces sensed by accelerometers onboard the aircraft are relayed to electronic controller 18 through input 22 to control the operation of G valve system 14 in a manner to be described hereinafter. Briefly referring to FIG. 4, the applied stick force input to electronic controller 18 results in output command signal $P_{nzs}$, defined as a command pressure due to predetermined accelerative force as a function of stick force. $P_{nzs}$ is added to a command signal $P_{nza}$, which is defined as a output command signal due to sensed acceleration. The sum of $P_{nzs}$ and $P_{nza}$ is further modified and relayed to G valve system 14 to regulate the pressurization of G suit 10. In order to regulate pressurization of G suit 10 as a function of the normal accelerative forces, $P_{nzs}$ (predetermined normal acceleration) is decreased at a predetermined rate as $P_{nza}$ (sensed normal acceleration) increases. The sum of the two command pressures, $P_{nzs}$ and $P_{nza}$ results in a command pressure $P_{nz}$, defined as an output command pressure for normal acceleration, which controls the pressurization of G suit at the required level in a manner to be described hereinafter. It should therefore be appreciated that the present invention provides for G suit pressurization which is rapidly and continuously maintained as a function of the normal accelerative forces experienced by the aircrew.

Referring to FIG. 1, as discussed previously, in order to enhance the high altitude protection achieved from positive pressure breathing, partial inflation of G suit 10, particularly in the abdominal area, has found to be beneficial. The pressure created in the aircrew member's breathing mask 26 as a result of the positive pressure is relayed to control system 18 at input 24 where it is processed, as a separate command signal $P_{ppb}$. Comparison is made between $P_{nz}$ and $P_{ppb}$, and the greater value of the two commanded pressures is transmitted for further downstream processing for operation of G valve system 14.

In the event positive pressure breathing is used to enhance G protection, command signal $V_{mcmd}$ is transmitted from control system 18 to a pressure regulator 28 to regulate the gas flow from breathing gas supply 30 to breathing mask 26 and a counterpressure garment 34, so that positive pressure breathing is initiated at a predetermined G force level.

Figure 3:
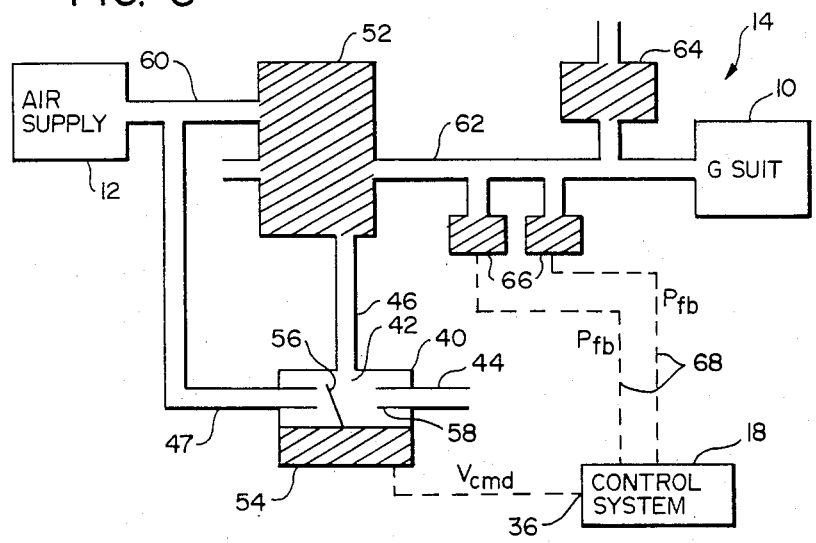
FIG. 3 is a block diagram illustrating the interrelationship of valving hardware with control electronics to pressurize an anti-G suit.

In order to regulate the flow of air from air supply 12 to G suit 10, there is provided a typical G valve system 14 known to those with ordinary skill in the art and illustrated in greater detail in FIG. 3. Control system 18 regulates a control servo valve 40 which in turn controls a main control valve 52 to control the flow of air from air supply 12 to G suit 10. Control servo valve 40 includes an interior chamber 42 in communication with (i) a conduit 44 for venting air to ambient, (ii) a conduit 46 in communication with main control valve 52 for transmitting control pressures thereto and (iii) a conduit 47 in communication with air supply 12 for conducting air at a constant pressure to chamber 42 from air supply 12. Command signal ($V_{cmd}$) from control system 18 directs a torque motor 54 of servo valve 40 to position a flapper arm 56 within chamber 42 between a first position proximate to outlet 58 of conduit 47 wherein the air flow from air supply 12 is restricted, and a second position proximate to inlet 58 of conduit 44 wherein flow of air from air supply 12 to ambient is restricted. Air flow through conduit 46, which is regulated by flapper arm 56, causes main valve 52 to open in an amount proportional to the control pressures transmitted through conduit 46, thereby allowing air to flow from air supply 12 through main valve 52 via a conduit 60, and from main valve 52 into G suit 10 via a conduit 62. Conduit 62 is in communication with a relief valve 64 to prevent overpressurization of G suit 10 in the event of the failure of valve system 14. In order to provide a feedback signal to control system 18, dual pressure transducers 66 are interposed within conduit 62 to sense the pressure therein and to transmit a signal, representative of the pressure entering G suit 10, via signal transmission lines 68 to control system 18. Two pressure transducers 66 are utilized to provide a cross check upon their operation. In the event of discrepancies therebetween, a warning indication is given to the aircrew member.

Figure 4:
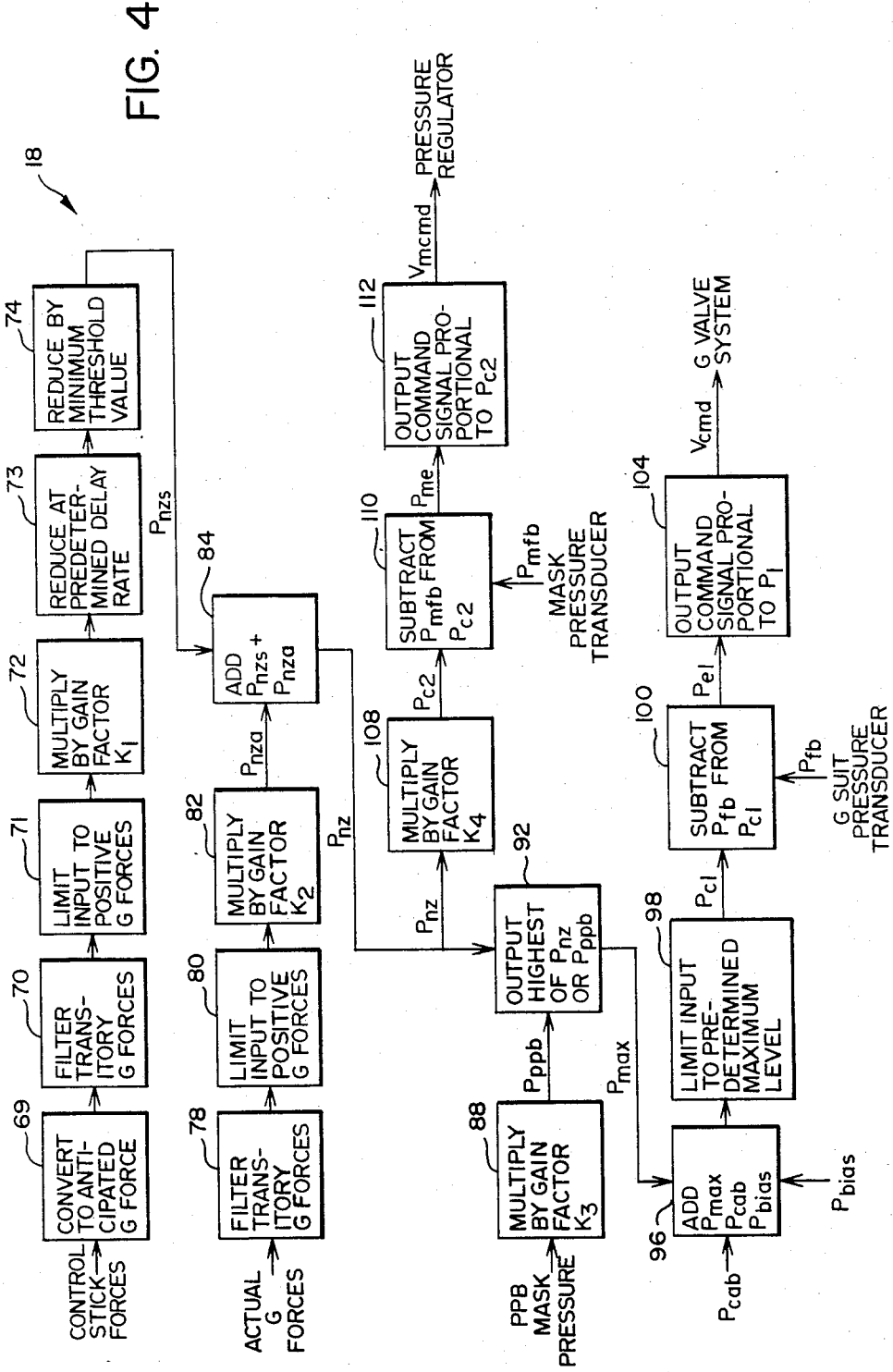
FIG. 4 is a flow chart illustrating the functions of the control electronics to provide a control servo valve command signal to regulate the pressurization of an anti-G suit and to control a breathing mask pressure regulator.

As indicated previously, control of G valve system 14 utilizing inputs defining control input forces, normal accelerative forces and breathing mask pressures is provided by control system 18. Control system 18 preferably comprises a digital control unit which is a microprocessor based system including permanent (ROM) and temporary memory (RAM), for storing software data relating to the desired control functions. An analog to digital convertor (ADC) is also included to convert analog inputs from sensors measuring control forces, normal accelerative forces, and positive pressure breathing forces to digital values for manipulation by the microprocessor. Referring to FIG. 4, there is shown a detailed functional diagram of control system 18. Forces applied to the aircraft control stick are sensed and converted at a converter block 69 to values corresponding to normal aircraft acceleration values produced by the corresponding control forces. The control force $F_s$ may be a selected control stick force, the result of redundant control stick forces, or control stick force sensor outputs applied to a signal selector in the aircraft flight control system, or may be measured directly by control stick force sensors interfaced with control system 18. In modern aircraft, such as the F-16, an aircraft flight control computer is programmed to respond with a specific normal acceleration in response to a specific control force in accordance with the schedule illustrated in FIG. 2. The accelerative values are passed through a filter block 70 designed to eliminate extraneous accelerative values produced by accidental or small transitory forces applied to the control stick where it is not desirable to pressurize G suit 10. This filtering action is described by the equation $F(s)=s/(s+4)$ wherein F(s) defines a Laplace transformation. Accelerative values are limited to positive accelerations by passage through a one-sided dead zone at block 71, and then multiplied by a gain factor at $K_1$ at multiplier block 72 to determine the pressure to be exerted by G suit 10 per G of accelerative force.

As discussed previously, the commanded pressure due to stick force ($P_{nzs}$) is designed to decay over time at a predetermined rate as the commanded pressure due to normal accelerative forces ($P_{nza}$) increases. This decay or washout rate, in effect, anticipates the onset of G forces. The rate of decay is selected so that the command pressure due to stick force $P_{nzs}$ decays at the same rate as the command pressure due to normal acceleration $P_{nza}$ increases. The rate of increase of $P_{nza}$ is a function of the response time of the aircraft. In order to reduce the value of $P_{nzs}$ as $P_{nza}$ increases, there is provided a washout block 73 programmed at a rate depending on the response rate of the aircraft. The minimum value of 0.2 G's is provided at a threshold block 74 so that minor accelerative forces below 0.2 G's will not inflate G suit 10.

In order to determine the level of actual accelerative forces, normal accelerative forces experienced by the aircrew are sensed by accelerometers in the aircraft which generate a signal which is input to a filter block 78. Filter block 78 may be described by the equation $F(s)=4/(s+4)$ wherein F(s) defines a Laplace transformed equation. Filter block 78 removes minor or transitory accelerative inputs when it is not desirable to inflate G suit 10. Only positive accelerative inputs are allowed to pass through a dead zone block 80. The resulting accelerative values from dead zone block 80 are multiplied by a gain factor $K_2$ at multiplication block 82 to provide a selected G suit pressure per G of measured accelerative force. The resultant value is the commanded pressure due to sensed aircraft acceleration ($P_{nza}$), which is added to the commanded pressure due to stick force ($P_{nzs}$) at addition block 84, the sum of which is the commanded pressure due to acceleration $P_{nz}$. It can be appreciated that the values of K1, K2 and the decay rate of washout block 73 are factors which may be adjusted in electronic control system 18 to obtain the desired value of $P_{nz}$. In order to obtain a commanded pressure $P_{nz}$ which is indicative of the actual normal accelerative forces experienced by the aircrew member, the decrease in commanded pressure $P_{nzs}$ over time must approximate the increase in actual normal accelerative forces over time. As discussed previously, the purpose of commanded pressure $P_{nzs}$ is to initiate G suit pressurization concurrent with control stick force application, and to continue G suit pressurization until the commanded pressurization input $P_{nza}$ is indicative of the actual normal accelerative forces experienced by the aircrew member. As discussed previously, the decay rate of washout block 73 optimally will be designed to correspond to the rate of increase of G forces experienced by the aircrew, an exponential increase as a function of time, which in turn is largely a function of the response time of the aircraft to the control inputs. It has been found that a time constant decay rate approximates the increase in accelerative forces when the aircraft engages in normal accelerative flight maneuvers. If the decay rate at washout block 73 is too rapid, the resulting value of commanded pressure $P_{nz}$ will be too low and G suit 10 will be underpressurized in relation to the actual G force level. On the other hand, if the decay rate at washout block 73 is too slow, the commanded pressure $P_{nz}$ will be too high and G suit 10 will overpressurize. It is desirable to set the decay rate at washout block 73 to equal a time constant value equivalent to the response time of the aircraft. Time constant is defined as the time for an exponential quantity to change by an amount equal to 0.632 times the total change that will occur. When the response time of the aircraft is relatively constant throughout various flight conditions and aircraft conditions, then the washout time constant may remain the same. However, when the response time of the aircraft varies due to changes in, for example, aircraft speed, altitude, or gross weight, then the relationship of response time to these changing variables is determined to achieve a more accurate washout rate. As an alternative, a mean response time may be utilized to provide a constant decay rate. The mean response time is an average response time measured over the various flight and aircraft conditions likely to be encountered.

In order to quantify the relationship of K1, K2 and the washout rate, the following prophetic example is provided:

EXAMPLE 1

Figure 5A:
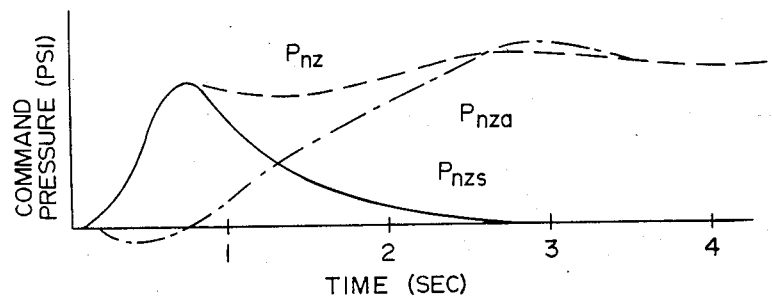
Figure 5B:
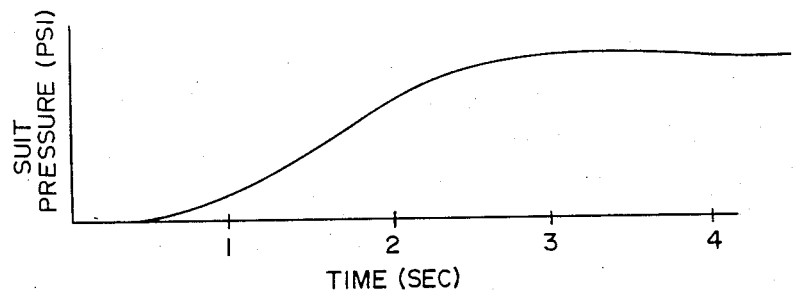

An aircraft having a commanded normal acceleration between 1.75 and 10.86 G's in accordance with the schedule of FIG. 2 is selected. The response time of the aircraft is determined to be 1.5 seconds. The washout rate is selected to have a time constant of 1.5 seconds. The values of $K_1$ and $K_2$ are selected so that $K_1=K_2=1.5$ psi per G. The relationship of pressure due to stick force ($P_{nzs}$) and the relationship of pressure due to actual acceleration ($P_{nza}$), as a function of time are graphically represented in FIG. 5A. The commanded pressure ($P_{nz}=P_{nza}+P_{nzs}$) as a function of time is also graphically represented. The time between application of a stick force and initiation of inflation of G suit 10 is determined to be 0.5 seconds. The time for inflation of G suit 10 from initiation to full pressure is determined to be a 1.5 second time constant. A graphical representation of G suit pressure as a function of time is shown in FIG. 5B. It can be appreciated that command pressure $P_{nz}$ is a relatively constant value representative of the actual normal accelerative forces, which produces inflation of G suit 10 essentially coincident with actual aircraft acceleration, earlier than that available with conventional G suit systems.

Referring to FIG. 4, in order to pressurize G suit 10 when undergoing positive pressure breathing, a pressure sensor (not shown), activated at the onset of positive pressure breathing, relays a signal proportional to the mask pressure to control system 18 where it is multiplied by a gain factor $K_3$ at multiplication block 88. $K_3$ typically comprises a factor value of four wherein the pressure in G suit 10 is four times the pressure in the oxygen mask. The maximum mask pressure is typically around 70 mm; therefore, a maximum G suit pressure during positive pressure breathing is approximately 280 mmHg or a pressure of approximately 1.35 psi. The resulting value is a commanded pressure for positive pressure breathing ($P_{ppb}$) which is compared to the commanded pressure due to acceleration $P_{nz}$ at comparison block 92, and wherein the commanded pressure having the largest value is output therefrom as $P_{max}$. Typically, the highest pressure during accelerative maneuvers will be $P_{nz}$. However, when the aircraft is experiencing little or no accelerative forces, the commanded pressure $P_{ppb}$ may constitute the highest value and therefore be transmitted as $P_{max}$ to insure G suit 10 is inflated to the required value during positive pressure breathing.

It is desirable that a bias pressure $P_{bias}$ be applied to G suit 10 at all times so that when the onset of accelerative forces occurs, the bladders of G suit 10 are partially inflated so that less time is required for inflation to the desired pressure. In addition, the small bias pressure, typically less than 0.25 psi, has the advantage of keeping G valve system 14 and G suit 10 continuously active to provide continuous feedback to control system 18. $P_{bias}$ is added to $P_{max}$ at an adding block 96.

It can be appreciated that the command pressure $P_{max}$ will vary according to aircraft cabin pressure. As cabin pressure decreases due to increase in aircraft altitude, it is desirable that the command pressure signal $P_{max}$ also decrease to avoid overinflation of G suit 10. Therefore ambient cabin pressure $P_{cab}$ is added to $P_{bias}$ and $P_{max}$ at addition block 96 to provide a command pressure $P_{cl}$ which decreases as cabin pressure increases. The value of $P_{cl}$ may be limited at limiter block 98 to prevent over inflation of G suit 10 at very high altitudes.

A selected feedback pressure $P_{fb}$ of G suit 10, sensed by transducers 66 (FIG. 3), is compared to $P_{cl}$ at error detection block 100, the difference between $P_c$ and $P_{fb}$ yielding an error pressure signal $P_{el}$. Detection and amplification of error pressure signal $P_{el}$ to a desired level is accomplished by automatic controller 104. Controller 104 provides a command signal output $V_{cmd}$ which controls the operation of G valve system 14 in a manner described previously. Controller 104 is preferably a proportional-plus-integral controller, the function of which is known to those of ordinary skill in the art. The control transfer function of controller 104 is defined by the Laplace-transformed equation $F(s) = K_{I/s} + K_p$ in which $K_{I/s}$ defines the integral control action for driving a steady state quantity of $P_{el}$ to zero, and in which $K_p$ defines the proportional control action for providing an output from controller 104 proportional to $P_{el}$. The proportional term will usually dominate, whereas the integral term will be relatively small since it is used to minimize steady state error during normal flight. The rapid large-scale outputs required during high G maneuvers is provided by the proportional term.

As discussed previously, it may be beneficial to initiate positive pressure breathing during the onset of G forces to provide additional G protection. In order to do so, the commanded pressure $P_{nz}$ is multiplied by a gain factor $K_4$ at multiplication block 108 (FIG. 4) to provide a command pressure $P_{c2}$. $K_4$ is assigned a value so that between about four G's to about nine G's, the pressure in breathing mask 26 increases linearly from zero to approximated 60 mm Hg. A measured pressure from outlet 109 of pressure regulator 28 (FIG. 1) is sensed and fed back to control system 18 at error detection block 110 (FIG. 4) where it is subtracted from commanded pressure $P_{c2}$ to yield a breathing mask error signal $P_{me}$. Error signal $P_{me}$ is transmitted to a controller block 112 where signal $P_{me}$ is detected and amplified to produce a command signal $V_{mcmd}$ supplied to pressure regulator 28 for producing in breathing mask 26 a pressure in excess of ambient cabin pressure. Controller 112 is preferably a proportional-plus-integral controller similar to controller 104 for providing a control output proportional to the error signal $P_{me}$, and for providing integral control action for driving a steady state value of $P_{me}$ to zero.

What is claimed is:

1. Apparatus for controlling the pressurization of an anti-acceleration garment worn by an occupant of an aircraft, said apparatus comprising:
   a. first valve means for regulating the flow of fluid to said anti-acceleration garment to control the pressurization thereof;
   b. control means including:
      (1) means for (i) determining a level of an anticipated accelerative force which is generally perpendicular to a longitudinal axis of said aircraft in a manner that said level of anticipated accelerative force is determined as a function of a level of control force applied to said aircraft that would create said accelerative force, and (ii) for generating a first output indicative of said anticipated accelerative force level,
      (2) means (i) for determining a level of sensed accelerative force which is generally perpendicular to said longitudinal axis of said aircraft, and (ii) for generating a second output indicative of said sensed accelerative force level,
      (3) means for compensating for an increase in said sensed accelerative force level by decreasing said first output at a selected rate as said level of sensed accelerative force increases and for generating a third output indicative of said decreased first output,
      (4) means for combining said second output with said third output to generate a first command output equal to the sum of said second and third outputs; and
   c. first valve control means (i) responsive to saud command output, and (ii) operatively connected to said first valve means, for regulating said first valve means to control the flow of fluid to said anti-acceleration garment as a function of said command output.

2. The apparatus as set forth in claim 1 wherein said control force is defined as a force applied to a control member of said aircraft.

3. The apparatus as set forth in claim 1 wherein said control force is defined as a force applied to an aircraft flight control by said occupant of said aircraft.

4. The apparatus as set forth in claims 2 or 3 wherein said control means includes computer means having a memory for storing information which defines said anticipated accelerative force level as a function of said applied force in order to generate said first output.

5. The apparatus as set forth in claim 4 wherein said computer memory contains information for decreasing said level of said first output at said selected rate.

6. The apparatus as set forth in claim 5 wherein said selected rate of decrease is substantially equivalent to a rate of increase of said sensed accelerative force level.

7. The apparatus as set forth in claim 6 wherein said rate of increase of said accelerative force level is a predetermined time constant equivalent to a time interval between initiation of said control input and response of said aircraft to said control input.

8. The apparatus as set forth in claim 7 wherein said time interval between initiation of said control input and response of said aircraft to said control input is predicted from known dynamic response characteristics of said aircraft.

9. The apparatus as set forth in claim 1 wherein said control means includes:
   a. means for generating a fourth output representative of a bias pressure for maintaining partial inflation of said anti-acceleration garment during absence of said anticipated and said actual accelerative forces; and
   b. means for adding said fourth output to a sum of said second output and said third output to produce said first command output.

10. The apparatus as set forth in claim 1 wherein said control means includes:
   a. means (i) for determining a level of atmospheric pressure acting upon said anti-acceleration garment, and (ii) for generating a fifth output indicative of said atmospheric pressure; and
   b. means for adding said fifth output to said second and third outputs to generate said first command output whereby said first command output decreases as the level of atmospheric pressure decreases.

11. The apparatus as set forth in claim 1 additionally comprising:
   a. sensor means (i) for determining a pressure of a gas delivered to a breathing device worn by said occupant, and (ii) for generating a sixth output indicative of said gas pressure; and
   b. means, responsive to a (i) sum of said second output and said third output and (ii) said sixth output, arranged to output the greater of said sum and said sixth output to produce said first command output.

12. The apparatus as set forth in claim 1 wherein said control means includes:
   a. second valve means for controlling a pressure of a gas delivered to a breathing device worn by said occupant of said aircraft; and
   b. second valve control means responsive to said first command output and operatively connected to said second valve means for regulating said second valve means to generate a pressure in excess of ambient pressure within said breathing device.

13. Apparatus for controlling a valve to regulate the flow of fluid into an anti-acceleration garment worn by an occupant of an aircraft, said apparatus comprising:
   a. means (i) for determining a level of an anticipated accelerative force generally perpendicular to a longitudinal axis of said aircraft in a manner that said level of anticipated accelerative force is determined as a function of a level of control force applied to said aircraft that would create said accelerative force (ii) for generating a first output indicative of said anticipated accelerative force level;
   b. means (i) for determining a level of sensed accelerative force generally perpendicular to said longitudinal axis of said aircraft, and (ii) for generating a second output indicative of said sensed accelerative force level;
   c. means for compensating for an increase in said sensed accelerative force level by decreasing said first level of output at a selected rate as, said sensed accelerative force increases and for generating a third output indicative of said decreased first output; and
   d. means for combining said second output with said third output to generate a first command output equal to the sum of said second and third outputs to regulate said valve as a function of said first command output.

14. The apparatus as set forth in claim 13 wherein said level of anticipated accelerative force is proportional to said control force.

15. The apparatus as set forth in claim 14 wherein said control force is defined as a force applied to a control member of said aircraft.

16. The apparatus as set forth in claim 14 wherein said control force is defined as a force applied to an aircraft flight control by said occupant of said aircraft.

17. The apparatus as set forth in claim 16 wherein said means for determining an anticipated level of accelerative force includes computer means having a memory for storing information which defines said anticipated level of accelerative force as a function of said applied force.

18. The apparatus as set forth in claim 17 wherein said computer memory contains information for decreasing said level of said first output at said predetermined rate.

19. The apparatus as set forth in claim 18 wherein said selected rate of decrease is substantially equivalent to a rate of increase of said accelerative force, said rate of increase of said accelerative force comprising a predetermined time constant equivalent to a time interval between initiation of said control input and response of said aircraft to said control input.

20. A method for controlling the pressurization of an anti-acceleration garment worn by an occupant of an aircraft, the method comprising the steps of:
   a. determining a level of anticipated accelerative force which is generally perpendicular to a longitudinal axis of the aircraft in a manner that the level of anticipated accelerative force is determined as a function of a level of control force applied to the aircraft that would create said accelerative force to generate a first output indicative of the anticipated accelerative force level;
   b. determining a level of sensed accelerative force which is generally perpendicular to a longitudinal axis of the aircraft to generate a second output indicative of the sensed accelerative force level;
   c. decreasing the first output at a selected rate as the level of sensed accelerative force increases to generate a third output indicative of the decreased first output; and
   d. adding the second output to the third output to generate a first command output equal to the sum of said second and third outputs and using said first command output as a function for the pressurization of the garment.

21. The method as set forth in claim 20 wherein the control force is defined as a force applied to a control member of the aircraft.

22. The method as set forth in claim 20 wherein the control force is defined as a force applied to an aircraft flight control by the occupant of the aircraft.

23. The method as set forth in claim 22 wherein the level of the first output is decreased at a predetermined rate.

24. The method as set forth in claim 23 wherein the selected rate of decrease is substantially equivalent a rate of increase of the accelerative force level.

25. The method as set forth in claim 24 wherein the rate of increase of the accelerative force level is a predetermined time constant equivalent to a time interval between initiation of the control input and response of the aircraft to the control input.

26. The method as set forth in claim 20 additionally comprising the steps of:
   a. generating a fourth output representative of a bias pressure for maintaining partial inflation of the anti-acceleration garment during absence of the anticipated and sensed accelerative force levels; and
   b. adding the fourth output to a sum of the second output and the third output to produce the first command output.

27. The method as set forth in claim 20 additionally comprising the steps of:
   a. determining a level of atmospheric pressure acting upon the anti-acceleration garment to generate a fifth output indicative of the atmospheric pressure; and
   b. adding the fifth output to the second and third outputs to generate the first command output whereby the first command output decreases as the level of atmospheric pressure decreases.

28. The method as set forth in claim 20 additionally comprising the steps of:
   a. determining a pressure of a gas delivered to a breathing device worn by the occupant to generate a sixth output indicative of the gas pressure; and
   b. generating an output equal to the greater of (i) a sum of the second and third outputs and (ii) the sixth output, to produce the first command output.

29. The method as set forth in claim 20 additionally comprising the step of generating a pressure in excess of ambient pressure inside the breathing device in response to the first command output.

30. Apparatus for controlling the pressurization of an anti-acceleration garment worn by an occupant of an aircraft, said apparatus comprising:
   a. first valve means for regulating the flow of fluid to said anti-acceleration garment to control a pressurization thereof;
   b. control means including
      (1) means (i) for determining an anticipated level of accelerative force generally perpendicular to a longitudinal axis of said aircraft as a function of a control input to said aircraft that would create said accelerative force level, said control input being defined as a force applied to a control member of said aircraft, and (ii) for generating a first output indicative of said anticipated accelerative force level,
      (2) means (i) for determining an actual level of accelerative forces generally perpendicular to said longitudinal axis of said aircraft, and (ii) for generating a second output indicative of said actual accelerative force level,
      (3) means for decreasing said first output at a selected rate as said rate of said actual accelerative force level increase and for generating a third output indicative of said decreased output, said control means including computer means having a memory for storing information which defines said anticipated accelerative force level as a function of said applied force, said information defining said first output, said computer memory containing information for decreasing said level of said first output at said selected rate, said predetermined rate of decrease being substantially equivalent to a rate of increase of said actual accelerative force level,
      (4) means for combining said second output with said third output to generate a first command output equal to the sum of said second and third outputs; and
   c. first valve control means (i) responsive to said command output and (ii) operatively connected to said first valve means, for regulating said first valve means to control the flow of fluid to said anti-acceleration garment as a function of said first command output.

31. The apparatus as set forth in claim 30 wherein said rate of increase of said accelerative force level is a predetermined time constant equivalent to a time interval between initiation of said control input and response of said aircraft to said control input.

* * * * *